United States Patent
Paisley

(10) Patent No.: US 11,861,639 B2
(45) Date of Patent: Jan. 2, 2024

(54) CONSUMER TRACKING AND ENGAGEMENT PROCESSING

(71) Applicant: NCR Corporation, Atlanta, GA (US)

(72) Inventor: Dennis Lyle Paisley, Johns Creek, GA (US)

(*) Notice: Subject to any disclaimer, the term of this patent is extended or adjusted under 35 U.S.C. 154(b) by 0 days.

(21) Appl. No.: 17/695,396

(22) Filed: Mar. 15, 2022

(65) Prior Publication Data
US 2022/0207550 A1    Jun. 30, 2022

Related U.S. Application Data

(63) Continuation of application No. 16/049,135, filed on Jul. 30, 2018.

(51) Int. Cl.
| | | |
|---|---|---|
| *G06Q 30/00* | (2023.01) | |
| *G06Q 30/0207* | (2023.01) | |
| *G06Q 30/0201* | (2023.01) | |
| *H04W 4/029* | (2018.01) | |
| *H04W 4/021* | (2018.01) | |
| *H04L 67/12* | (2022.01) | |

(52) U.S. Cl.
CPC ..... *G06Q 30/0207* (2013.01); *G06Q 30/0201* (2013.01); *H04W 4/029* (2018.02); *H04L 67/12* (2013.01); *H04W 4/021* (2013.01)

(58) Field of Classification Search
CPC .......... G06Q 30/0207; G06Q 30/0201; H04W 4/029; H04W 4/021; H04L 67/12; H04L 67/535; H04L 67/52
See application file for complete search history.

(56) References Cited

U.S. PATENT DOCUMENTS

| | | | | |
|---|---|---|---|---|
| 7,974,869 | B1* | 7/2011 | Sharma | G06Q 30/02 |
| | | | | 705/7.31 |
| 8,412,656 | B1* | 4/2013 | Baboo | G06Q 30/06 |
| | | | | 706/20 |
| 8,433,612 | B1* | 4/2013 | Sharma | G06Q 30/06 |
| | | | | 705/7.29 |
| 10,713,670 | B1* | 7/2020 | Moon | G06Q 30/0201 |
| 10,929,675 | B2* | 2/2021 | Costello | G07G 1/0009 |
| 11,049,170 | B1* | 6/2021 | Francis | G07G 1/0036 |
| 2013/0222599 | A1* | 8/2013 | Shaw | G06V 10/20 |
| | | | | 345/635 |
| 2014/0063262 | A1* | 3/2014 | Edwards | G06Q 20/4016 |
| | | | | 705/16 |
| 2015/0029339 | A1* | 1/2015 | Kobres | H04N 7/181 |
| | | | | 348/150 |
| 2016/0019417 | A1* | 1/2016 | Kobayashi | G06F 3/04842 |
| | | | | 382/118 |
| 2016/0086191 | A1* | 3/2016 | Fonzi | G06Q 30/0281 |
| | | | | 705/304 |
| 2017/0206571 | A1* | 7/2017 | Dhawan | G06Q 30/0613 |

(Continued)

*Primary Examiner* — Meredith A Long
(74) *Attorney, Agent, or Firm* — Schwegman Lundberg & Woessner, P.A.

(57) ABSTRACT

A consumer's location relative to specific products situated within a store are tracked. Observed consumer behaviors are noted as well as return visits to a particular product area by the consumer while in the store. A notification is provided to an engagement manager and automated consumer assistance or product purchase enticements are provided to the consumer while the consumer remains in the store as automated actions processed in response to the consumer behaviors.

20 Claims, 4 Drawing Sheets

(56) References Cited

U.S. PATENT DOCUMENTS

| | | | |
|---|---|---|---|
| 2017/0270554 A1* | 9/2017 | Dandekar | G06Q 30/0601 |
| 2017/0278125 A1* | 9/2017 | Tietzen | G06Q 30/0229 |
| 2019/0043207 A1* | 2/2019 | Carranza | G06V 40/172 |
| 2019/0188734 A1* | 6/2019 | Nagai | G06Q 30/0201 |
| 2020/0034863 A1* | 1/2020 | Paisley | G06Q 30/0207 |
| 2022/0207550 A1* | 6/2022 | Paisley | H04W 4/029 |

* cited by examiner

CONSUMER TRACKING AND ENGAGEMENT PROCESSING

CROSS-REFERENCE TO RELATED APPLICATION

This application is a continuation of U.S. patent application Ser. No. 16/049,135, filed Jul. 30, 2018, which application and publication are incorporated herein by reference in its entirety.

BACKGROUND

Increasingly retailers are deploying technology to automate the shopping experience. Routinely, consumers can now user their mobile devices to purchase items and perform self-checkouts from stores. Even with these advancements, consumers are purchasing less in brick-and-mortar stores; rather, consumers are using physical stores as showcases to try out (look, feel, and operation of) products, which the consumer then subsequently purchases online outside of the store. This is having significant impacts on the revenues and continued viability of brick-and-mortar stores. Every year long-established retailers are closing physical stores as a result of this troubling trend.

Sometimes a consumer is willing and able to purchase a product in a physical store and the retailers are short staffed for purposes of saving expenses and as a result lose a potential sale. In fact, this situation is becoming more and more frequent within the retail industry. A willing consumer enters a store and goes to the product area of a desired product; more often than note, the product area also usually requires some type of attendant assistance.

For example, expensive products are typically locked up with just display models provided for consumer interaction/viewing, but consumer purchase requires an assistant to obtain the product and/or carry the product to the registers for the consumer to buy. As another example, a consumer may have questions about two different competing brands of a product or may have questions as to the features of a product. With short staffed stores, consumers wander aimlessly looking for an attendant and most become frustrated with the lack of an available assistance and simply leave the store. The consumer may photograph the products with their mobile phone, and return home where the product is purchased online.

These are but a few situations in which retailers are compounding the effects of the industry trend towards online shopping and away from conventional physical store shopping.

SUMMARY

In various embodiments, methods and a system for consumer tracking and engagement processing are presented.

According to an embodiment, a method for consumer tracking and engagement processing is presented. Specifically, and in one embodiment, a consumer is tracked with respect to a product or product area within a store. Conditions defined in retailer-provided rules are identified with respect to consumer actions associated with the product or product area. An automated action is triggered to engage the consumer while the consumer remains in the store.

DETAILED DESCRIPTION

Figure 1:
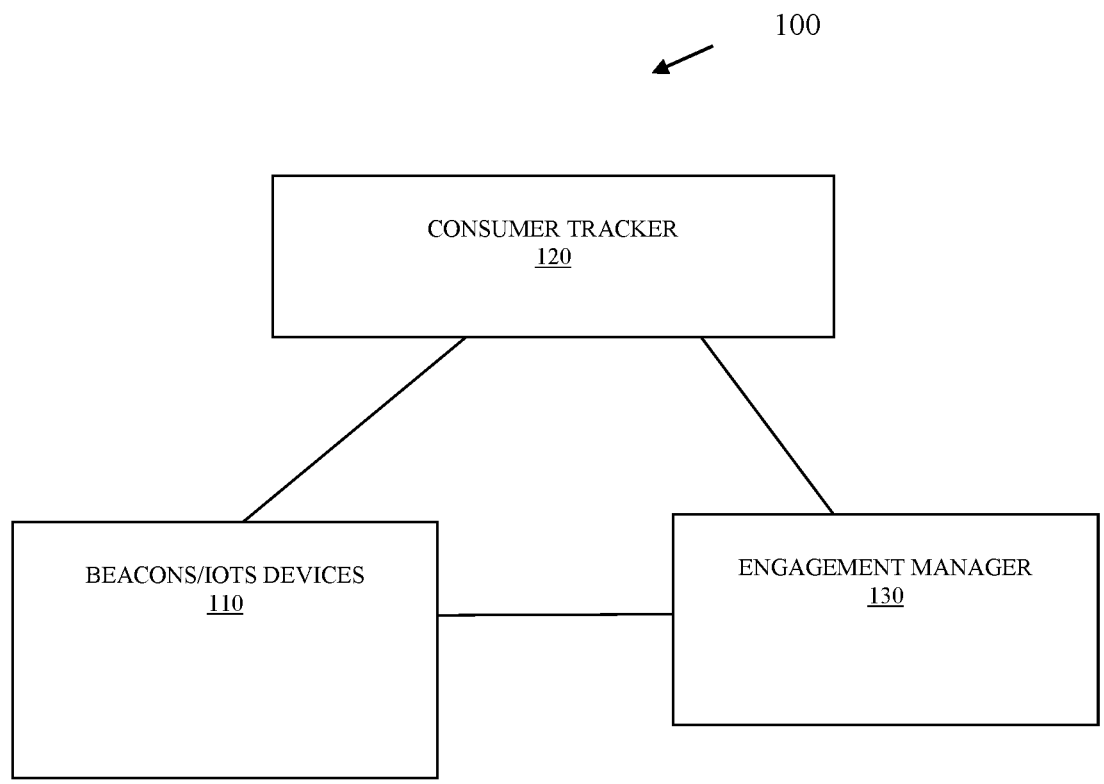
FIG. 1 is a diagram of a system for consumer tracking and engagement processing, according to an example embodiment.

FIG. 1 is a diagram of a system 100 for consumer tracking and engagement processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of consumer tracking and engagement processing, presented herein and below.

The system 100 includes: a plurality of wireless beacons and/or Internet-of-Things (IoTs) devices 110, and a consumer tracker 120, and an engagement manager 130.

As used herein the terms "consumer" and "customer" may be used interchangeably and synonymously.

Furthermore, the consumer may be a registered customer that includes a registered loyalty account with the retailer (store) such the customer is known to the retailer or the consumer may be an anonymous consumer that is unknown to the retailer.

When a consumer enters a retail store, a variety of different approaches and technology can be used to identify the consumer (if even as an anonymous unknown consumer) and track the consumer and all the various locations within the store that the consumer visits.

In some cases, the consumer is registered to the retailer and includes a mobile application that processes on the consumer's mobile device. The mobile application can use location services to send a notification to the consumer tracker 130 indicating that the consumer is now checked in at the retail store. In another case, the consumer can use a mobile device to scan a barcode presented at the entrance of the store, the scanning activates a mobile application that provides the consumer's mobile device number (identifier) to the consumer tracker 130.

In yet another situation, the retail store is equipped with cameras that perform image processing and identify the consumer as a unique blob of pixels distinguished from other consumer blobs of pixels. If permitted and registered with the retailer, facial recognition of the consumer may also be deployed to unique identify a known customer of the retailer when the customer enters the store.

In another circumstance, a low-energy BlueTooth® signal is emitted by beacons 110 situated throughout the retail store, which are picked up by a mobile application of the consumer and the mobile application relays a beacon identifier for the beacon 110 to the consumer tracker 130. The beacons 110 can be IoT devices 110 that perform minimal interaction with the consumer's mobile application, such as acquisition of mobile device identifier, the identifier is then forwarded by the IoT devices 110 along with the configured position of the IoT devices 110 to the consumer tracker 130.

So, the devices 110 can be wireless beacons that simply emit a beacon identifier where the consumer tracker 130 is preconfigured with the physical position of the beacons 110 within the store, such that when a mobile application sends a beacon identifier to the consumer tracker 130 (such as through a server connection for the retailer), the consumer tracker 130 can identify the mobile device (by the mobile device identifier) and determine the position of the mobile device within the retail store based on the beacon identifier. Alternatively or additionally, IoT devices 110 can interact with the mobile application of the consumer's mobile device and send its position within the store along with the consumer's mobile device identifier.

The beacons and/or IoT devices 110 are positioned throughout the store in product areas, such that when a consumer is in a product area the consumer's mobile device is either receiving a beacon signal for transmission to the consumer tracker 130 or the IoT device is in communication with the mobile device and is able to send the specific product area location along with the mobile device identifier.

In still another case, when vision technology is used, the cameras situated throughout the store provided reduced sized images that correspond to an image blob that is unique assigned to a consumer, each camera has a preconfigured known position within the store relative to a product area of the store. The metadata associated with the consumer blob image includes the camera identifier that captures the image, which the consumer tracker 130 can uses to identify the actual physical position of the consumer within the store.

In some embodiments, the IoT devices 110 include a camera and provide the vision tracking. Furthermore, the IoT devices 110 can interact with one another and pass the image blob for the consumer from one IoT device 110 to another IoT device 110 based on the direction of detected travel of the consumer within the store.

With all these various discussed mechanisms, the consumer tracker 130 is able to keep track of the physical position of the consumer while the consumer is within the retail store. The position of the consumer are passed to the engagement manager 120 at relatively short configured periods of time, such as every 10 seconds. The consumer tracker provides a unique consumer identifier (either known or unknown) and the current position of the consumer within the store.

The engagement manager 120 maintains a session for the visit of the consumer along with the various positions of the consumer within the store relative to specific known product areas and the length of time that the consumer remained within a known product area. For example, the television product area may encompass a range of positions, such that the consumer is identifiable by the engagement manager 120 as being within the television product area even when the consumer moves around the product area or even when the consumer is detected as temporarily leaving the product area but returns within a configured period of time, such as within 10 seconds or 15 seconds.

The engagement manager 120 includes a plurality of retailer-configured rules for engagement. Such as, a consumer was within a specific product area for a configured period of extended time, left the product area, and returned back to the product area. These rules represents conditions that when met trigger an automated action by the engagement manager 120, such as dispatch an attendant (through an automated message to an attendant-operated device) to the product area or present location of the consumer. The actions and rules are configurable. Some actions can include: dispatch and attendant, push a text message or mobile application message to the consumer-operated device asking whether assistance is desired, push a message providing a promotion for one or more products associated with the product area, and others.

The retailer can configure the engagement rules and corresponding actions within a user-facing interface to the engagement manager 120. Such that as the retailer identifies behaviors of consumers that are interested in products, the retailer can identify the actions that induce those consumers to make a purchase of the products while within the store and during the consumer's visit. In addition, some of the actions can be provided to the consumer-operated mobile device after the consumer has left the store without making a purchase to induce such a consumer to come back to the store and make a purchase. The retailer's knowledge of its customer's behaviors and best actions of the retailers to induce a customer purchase can be customized and defined by the retailer through the user-facing interface to the engagement manager 120.

In an embodiment, a camera associated with an IoT device 110 can also be used to perform image processing and determine when the consumer is looking at or interacting with a specific product. Such, specific product interest can be embodied in the rules and actions processed by the engagement manager 120. Thus, promotions with respect to a specific product within a known product area can be provided with the actions taken by the engagement manager 120. In this way, the promotions and assistance can be product specific; rather than generic with respect to a particular product area of the store.

Each IoT device 110 may be configured in some embodiments, to recognize and identify specific product-based images within the product area, such that when a customer interacts or picks up such a product, the product identifier can be provided by the IoT device 110 to the consumer tracker 130, which then relays such information to the engagement manager 120.

The engagement manager 120 keeps track of a variety of variable information (variable in the sense that it changes during a visit of a consumer), including time spent in specific product area during a consumer session (visit to a store), interaction with specific products within a specific product area, time spent by the consumer in an area that is adjacent to a specific product area for which the consumer has spent a configured period of time, interaction with specific product types (such as televisions, laptops, etc.) without any preference discerned for a specific product associated with the product types, and the like. The types of variable information tracked by the engagement manager can also be configured through a user-facing interface. Such that the tracked information can be changed by the retailer based on retailer knowledge of customer behaviors.

In an embodiment, video captured by the IoT devices 110 can be archived to the retail server and associated with a specific consumer visit (session), such video can be compressed and available for viewing through the user-facing interface by retail staff. This may be provided to behavior experts to associate behaviors with consumers that were enticed to make a product purchase versus behaviors associated with consumers that were not enticed to purchase during consumer visits to the retail store. Key behaviors may then be identified so as to improve customer purchases and interaction to provide actions within the engagement manager 120 that are most-likely to induce customer purchases from customer engaging in certain behaviors. The behaviors themselves can be defined in the variable information tracked by the engagement manager 120.

In an embodiment, the behaviors and success of enticement for in-store purchases can be quantified and provided to a loyalty campaign manager for providing marketing campaigns directed to segments of the retailer's customer base or directed to specific products or product types. This may be particularly useful in identifying beginning trends for the customer demand and interest in specific products or product types and for improving in store purchases. For example, product usage, warranties, and operational features may be sent to customers to alleviate and address customer questions before a customer comes to the store, ensuring that when customers come to the store they are ready to make a purchase of the product.

These and other embodiments are now discussed with reference to the FIGS. 2-4.

Figure 2:
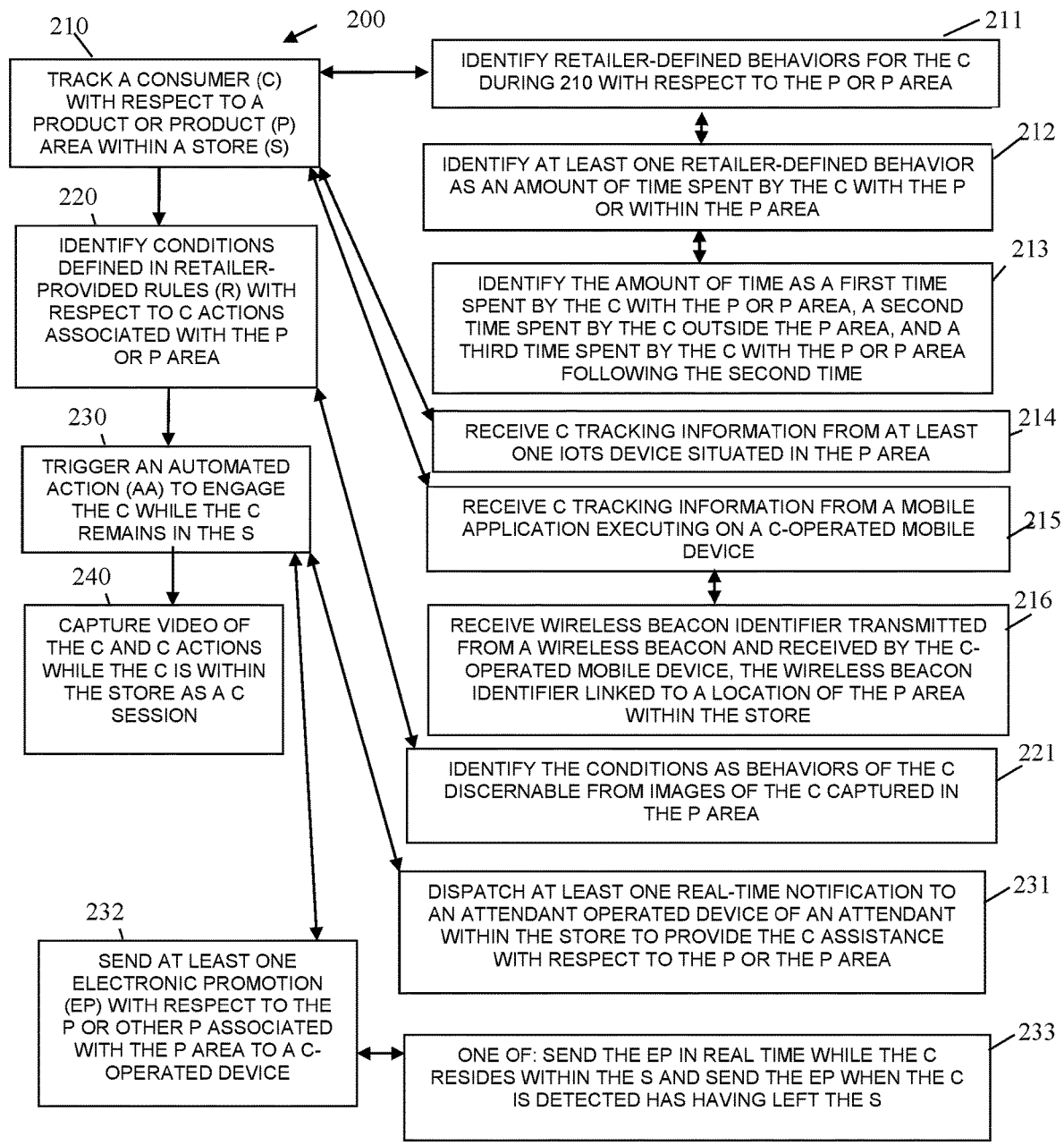
FIG. 2 is a diagram of a method for consumer tracking and engagement processing, according to an example embodiment.

FIG. 2 is a diagram of a method 200 for consumer tracking and engagement processing, according to an example embodiment. The software module(s) that implements the method 200 is referred to as a "real-time engagement manager." The real-time engagement manager is implemented as executable instructions programmed and residing within memory and/or a non-transitory computer-readable (processor-readable) storage medium and executed by one or more processors of a device. The processor(s) of the device that executes the real-time engagement manager are specifically configured and programmed to process the real-time engagement manager. The real-time engagement manager has access to one or more network connections during its processing. The network connections can be wired, wireless, or a combination of wired and wireless.

In an embodiment, the device that executes the real-time engagement manager is a server. In an embodiment, the server is a cloud processing environment that comprises multiple servers cooperating with one another as a single server. In an embodiment, the server is a Local Area Network (LAN) server of a retail store.

In an embodiment, the device that executes the real-time engagement manager is a network-edge device that is local or proximate to an edge of a LAN of a retail store.

In an embodiment, the real-time engagement manager is all or some combination of the engagement manager 120 and the consumer tracker 130.

At 210, the real-time engagement manager tracks a consumer with respect to a product or product area within a store. The tracking can occur in any of the above-mentioned manners described with the FIG. 1.

In an embodiment, at 211, the real-time engagement manager identifying retailer-defined behaviors for the consumer with respect to the product or the product area.

In an embodiment of 211 and at 212, the real-time engagement manager identifies at least one retailer-defined behavior as an amount of time spent by the consumer with the product or within the product area.

In an embodiment of 212 and at 213, the real-time engagement manager identifies the amount of time as a first time spent by the consumer with the product or product area, a second time spent by the consumer outside the product area, and a third time spent by the consumer with the product or product area following the second time.

In an embodiment, at 214, the real-time engagement manager receives consumer tracking information from at least one IoTs device situated in the product area. In an embodiment, the IoT device is IoT device 110.

In an embodiment, at 215, the real-time engagement manager receives consumer tracking information from a mobile application executing on a consumer-operated mobile device.

In an embodiment of 215 and at 216, the real-time engagement manager receives a wireless beacon identifier transmitted from a wireless beacon and received by the consumer-operated mobile device, the wireless beacon identifier linked to a location the product area within the store. In an embodiment, the wireless beacon is the wireless beacon 110.

At 220, the real-time engagement manager identifies conditions defined in retailer-provided rules with respect to consumer actions associated with the product or product area.

In an embodiment, at 221, the real-time engagement manager identifies the conditions as behaviors of the consumer discernable from images of the consumer captured in the product area.

At 230, the real-time engagement manager triggers an automated action to engage the consumer while the consumer remains in the store.

In an embodiment, at 231, the real-time engagement manager dispatches at least one real-time notification to an attendant operated device of an attendant within the store to provide the consumer assistance with respect to the product or the product area.

In an embodiment, at 232, the real-time engagement manager sends at least one electronic promotion with respect to the product or other products associated with the product area to a consumer-operated device.

In an embodiment of 232 and at 233, the real-time engagement manager performs one or more one of: sends the electronic promotion in real time while the consumer resides within the store and sends the electronic promotion when the consumer is detected has having left the store.

In an embodiment, at 240, the real-time engagement manager captures video of the consumer and consumer actions while the consumer is within the store as a consumer session.

Figure 3:
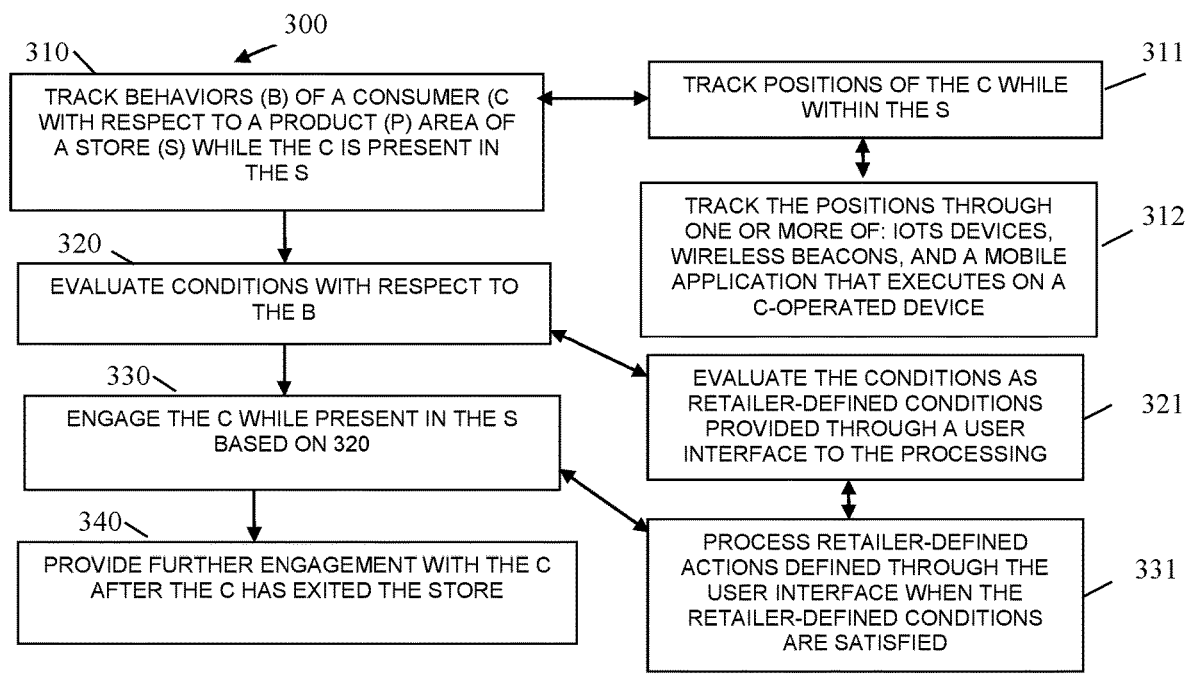
FIG. 3 is a diagram of another method for consumer tracking and engagement processing, according to an example embodiment.

FIG. 3 is a diagram of another method 300 for consumer tracking and engagement processing, according to an example embodiment. The software module(s) that implements the method 300 is referred to as an "in-store assistance manager." The in-store assistance manager is implemented as executable instructions programmed and residing within memory and/or a non-transitory computer-readable (processor-readable) storage medium and executed by one or more processors of a device. The processors that execute the in-store assistance manager are specifically configured and programmed to process the in-store assistance manager. The in-store assistance manager has access to one or more network connections during its processing. The network connections can be wired, wireless, or a combination of wired and wireless.

In an embodiment, the device that executes the in-store assistance manager is a server. In an embodiment, the server is a cloud processing environment that comprises multiple servers cooperating with one another as a single server. In an embodiment, the server is a LAN server that is local to a retail store.

In an embodiment, the device that executes the in-store assistance manager is a network-edge device that is on the edge of a LAN for a retail store.

In an embodiment, the in-store assistance manager is all or some combination of the engagement manager 120, consumer tracker, and/or the method 200.

The in-store assistance manager presents another and in some ways enhanced processing perspective to that which was described above with the FIG. 2.

At 310, the in-store assistance manager tracks behaviors of a consumer with respect to a product area of a store while the consumer is present in the store.

In an embodiment, at 311, the in-store assistance manager tracks positions of the consumer within the store.

In an embodiment of 311 and at 312, the in-store assistance manager tracks the positions through one or more of: IoTs devices, wireless beacons, and a mobile application that executes on a consumer-operated device.

At 320, the in-store assistance manager evaluates conditions associated with the behaviors.

In an embodiment of 312 and 320, at 321, the in-store assistance manager evaluates the conditions as retailer-defined conditions provided through a user interface to the in-store assistance manager.

At 330, the in-store assistance manager engages the consumer while present in the store based on the evaluating of 320.

In an embodiment of 321 and 330, at 331, the in-store assistance manager processes retailer-defined actions defined through the user interface when the retailer-defined conditions are satisfied.

In an embodiment, at 340, the in-store assistance manager provides further and continued engagement with the consumer after the consumer has exited the store.

Figure 4:
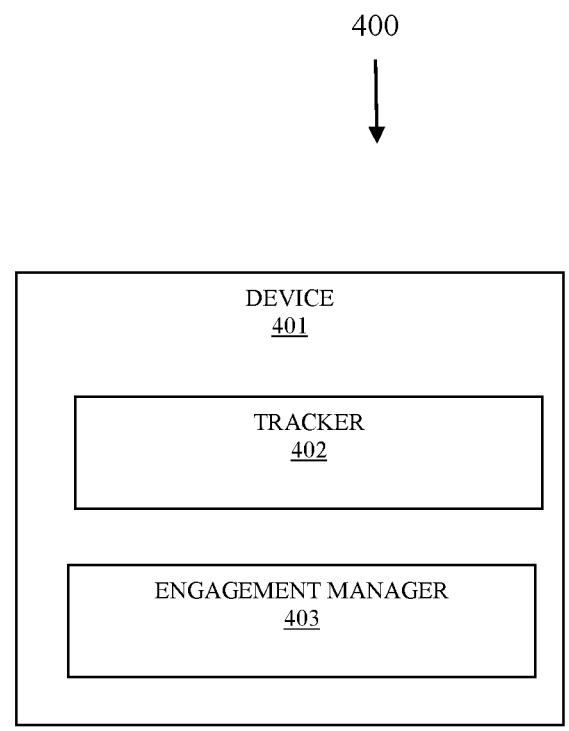
FIG. 4 is a diagram of a system for consumer tracking and engagement processing, according to an example embodiment.

FIG. 4 is a diagram of a system 400 for consumer tracking and engagement processing, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 is the system 100.

The system 400 includes a processing device 401, a tracker 402, and an engagement manger 403.

In an embodiment, the processing device 401 is a server. In an embodiment, the server is a collection of servers that cooperate as a cloud processing environment.

In an embodiment, the processing device 401 is a network edge device.

The tracker 402 and the engagement manager 403 is a set of executable instructions that is executed on one or more hardware processors of the processing device 401 from a non-transitory computer-readable storage medium or memory.

The tracker 402 is configured to: i) track positions of a consumer within a store and ii) report the positions to the engagement manager 403.

The engagement manager 403 is configured to: i) receive the positions of the consumer within the store from the consumer tracker 402, ii) identify when particular positions are within a specific product area of the store, iii) evaluate retailer-defined rules with respect to the consumer being within the specific product area, iv) process retailer-defined actions based on the rules for engaging the consumer while the consumer is present within the store.

In an embodiment, the engagement manager 403 is further configured to continue to engage the consumer after the consumer has left the store.

It is to be noted that although the various examples presented were within the context of online middleware food service providers, other embodiments of the invention are not so limited, such that any retailer middleware service that sells products other than food can benefit from the teachings presented herein and above.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method for tracking a customer throughout a store using images and metadata of the images performed by a server and devices situated throughout the store, comprising:
    configuring, by the server, the devices situated throughout the store to capture the metadata associated with a customer from images provided by adjacent cameras that are situated proximate to the devices throughout the store, wherein the devices are processing devices;
    configuring, by the server, the devices to process the metadata, to modify the metadata, and to pass modified metadata being processed by a current device to a next device based on a determined direction of travel for the customer identified from the modified metadata and the images;
    modifying, by the devices, the metadata based on the configuring;
    passing, by a current device, the modified metadata to a next device based on the determined direction of travel for the customer identified from the modified metadata and the images;
    providing, by the server, a customer identifier to associate with first metadata processed by a first device upon detection of the customer within the store and maintaining the customer identifier with the modified metadata;
    associating, by the first device, the customer identifier with the first metadata based on the providing;
    maintaining, by the first device the customer identifier with the first metadata;
    processing, by particular devices, the modified metadata as the customer travels throughout the store based on the modified metadata; and tracking, by the server, the customer as the customer travels throughout the store based on the modified metadata based on the processing by the particular devices and based on known locations for each of the particular devices and for each of the cameras within the store.

2. The method of claim 1, wherein configuring the devices to process the metadata further includes configuring the devices to report the modified metadata at configured periods of time.

3. The method of claim 2, wherein configuring the devices to report the modified metadata further includes configuring the devices to maintain and to report a length of elapsed time that each of devices were passed and were processing the modified metadata associated with the customer identifier at the configured periods of time.

4. The method of claim 1, wherein providing further includes establishing a session for the tracking when the customer identifier is provided to the first device.

5. The method of claim 1, wherein providing further includes detecting the customer entering the store based on a wireless beacon identifier for a wireless beacon, wherein the wireless beacon identifier transmitted by a mobile device of the customer.

6. The method of claim 1, wherein providing further includes detecting the customer entering the store based on receiving a current location for a mobile device registered to the customer, wherein the current location reported by the mobile device with a mobile device identifier registered to the customer.

7. The method of claim 1, wherein providing further includes detecting the customer entering the store based on receiving barcode information for a barcode from a mobile application processing on a mobile device operated by the customer, wherein the barcode information reported by the mobile device with a mobile device identifier registered to the customer.

8. The method of claim 1, wherein providing further includes detecting the customer entering the store based on the first device generating and reporting first metadata for the customer from a first image provided by a first camera.

9. The method of claim 1, wherein configuring the devices to process the metadata further includes configuring each of the devices to report a corresponding present location of the corresponding device and associating the corresponding present location with a corresponding known location within the store.

10. The method of claim 1, wherein tracking further includes processing rules configured by a retailer associated with the store, wherein the rules comprise conditions and action identifiers for automated actions to process when the conditions are detected from the modified metadata and the images.

11. The method of claim 10, wherein processing the rules further includes sending at least one action identifier for at least one automated action to a mobile application processed on a mobile device operated by the customer and instructing the mobile application to process the at least one automated action on the mobile device.

12. A method for tracking a customer throughout a store using images and metadata of the images performed by a server and devices situated throughout the store, comprising:
   detecting, by the server, a customer of a store within the store;
   obtaining, by the server, a customer identifier for the customer;
   providing, by the server, the customer identifier to the devices for the devices to detect and to track the customer through video captured by cameras in the store;
   detecting and tracking, by the devices, the customer through the video;
   reporting, by particular devices of the devices, portions of the video to the server based on the detecting and the tracking;
   receiving, by the server, the portions of the video at different reporting times from the particular devices as the customer is tracked within the store by the devices;
   associating, by the server, each portion of the video with the corresponding particular device, each reporting time with a current time of day, and the corresponding particular device with a known location within the store;
   maintaining, by the server, a session for the customer until a particular portion of the video indicates the customer has exited the store;
   during the session, evaluating, by the server, conditions associated with rules detected in the portions of the video; and
   triggering, by the server, processing of actions for the conditions that are satisfied based on the evaluating.

13. The method of claim 12 further comprising, archiving, by the server, a session identifier for the session, the customer identifier for the customer, the conditions that were satisfied, the actions, and the portions of the video received from the particular devices during session as a customer session associated with tracking of the customer within the store.

14. The method of claim 12, wherein evaluating further includes identifying at least one condition as being satisfied based on a length of time that the customer is determined to have been within a particular area of the store during the session.

15. The method of claim 12, wherein evaluating further includes identifying at least one condition as being satisfied based on a selective portion of the video being analyzed and determining that the customer handled a particular product associated with a particular known location of the store during the session.

16. The method of claim 12, wherein evaluating further includes identifying at least one condition as being satisfied based on a selective portion of the video being analyzed and determining that the customer was looking at a particular product associated with a particular known location of the store during the session.

17. The method of claim 12 further comprising, receiving, by the server, a request to view the session, obtaining the portions of the video, and playing the video within an interface associated with the request.

18. The method of claim 12 further comprising, compressing, by the server, the portions of the video as a compressed video, associating the customer identifier with the compressed video, associating the rules with the compressed video, associating the conditions that were satisfied from evaluation of the portions of the video with the compressed video, and associating the actions with the video when the particular portion of the video indicates the customer has exited the store.

19. A system, comprising:
   devices situated throughout a store, wherein the devices are processing devices;
   cameras situated throughout the store;
   a hardware processor of a server;

a non-transitory computer-readable storage medium comprising executable instructions; and the executable instructions executed by the hardware processor from the non-transitory computer-readable storage medium cause the hardware processor to perform operations, comprising:

configuring the devices to capture metadata associated with a customer from images provided by adjacent cameras that are situated proximate to the devices throughout the store;

configuring the devices to process the metadata, to modify the metadata, and to pass modified metadata being processed by a current device to a next device based on a determined direction of travel for the customer identified from the modified metadata and the images;

providing a customer identifier to associate with first metadata processed by a first device upon detection of the customer within the store and maintaining the customer identifier with the modified metadata; and tracking the customer as the customer travels throughout the store based on the modified metadata, particular devices currently processing the modified metadata, and known locations for each of the particular devices and for each of the cameras within the store;

the devices configured to perform second operations, comprising:

processing the images to track the customer by processing and modifying the metadata associated with the images;

passing, by a current device, the modified metadata to the next device based on the determined direction of travel for the customer identified from the modified metadata and images;

associating, by the first device, the customer identifier for the customer with the modified metadata; and reporting, by particular devices, portions of the images for the video to the server based on the modified metadata.

20. The system of claim 19, wherein the executable instructions executed by the hardware processor from the non-transitory computer-readable storage medium further cause the hardware processor to perform additional operations, comprising:

establishing a session for the tracking;

evaluating rules associated with a store during the session based on analyzing the images and the modified metadata;

triggering the processing of actions based on conditions that are satisfied within the rules during the evaluating;

compressing the images as a compressed video for the session when the session ends; and associating with the compressed video, the customer identifier, the rules, the conditions that were satisfied and the actions.

* * * * *